No. 706,899. Patented Aug. 12, 1902.
J. CARTER.
EYEGLASSES.
(Application filed Jan. 10, 1902.)
(No Model.)
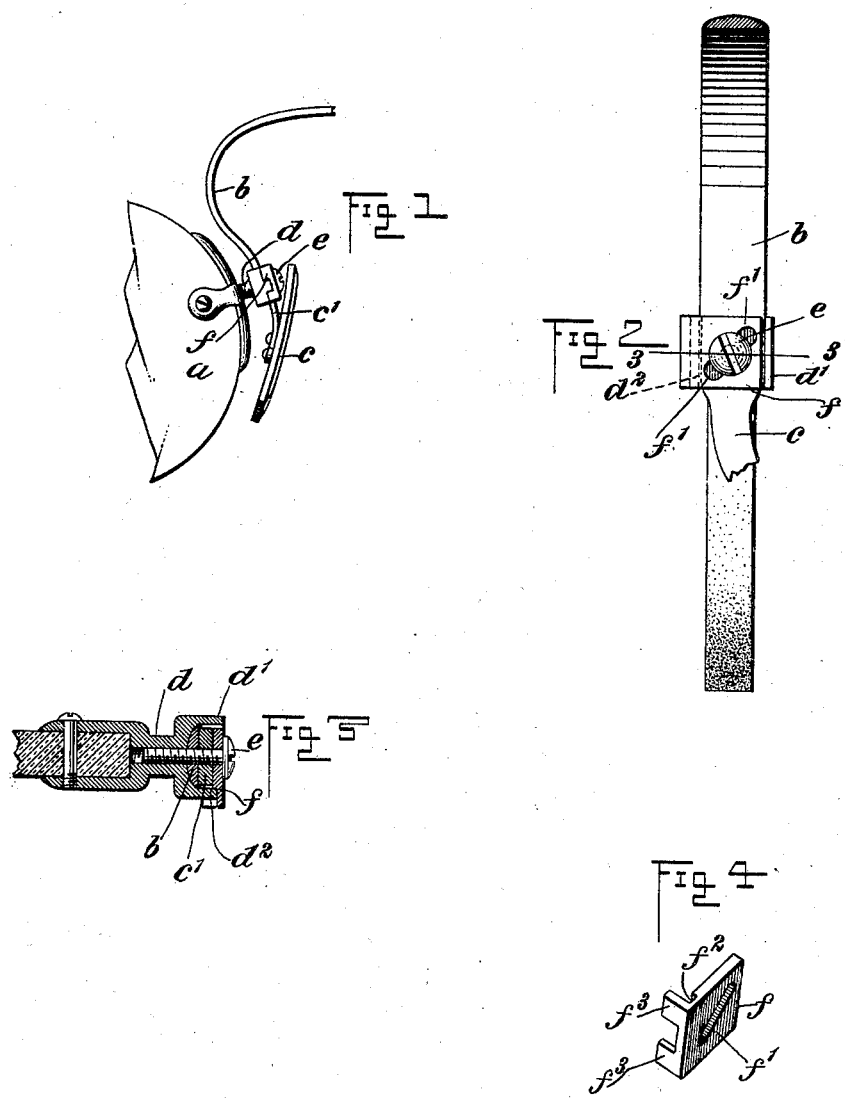
WITNESSES:
INVENTOR
John Carter
BY
ATTORNEYS

UNITED STATES PATENT OFFICE.

JOHN CARTER, OF MALDEN, MASSACHUSETTS, ASSIGNOR OF ONE-HALF TO ALFRED G. CARTER, OF MALDEN, MASSACHUSETTS.

EYEGLASSES.

SPECIFICATION forming part of Letters Patent No. 706,899, dated August 12, 1902.

Application filed January 10, 1902. Serial No. 89,142. (No model.)

*To all whom it may concern:*

Be it known that I, JOHN CARTER, a citizen of the United States, and a resident of Malden, in the county of Middlesex and State of Massachusetts, have invented new and useful Improvements in Eyeglasses, of which the following is a full, clear, and exact description.

This invention relates to a means for fastening the spring and guard to the stud of eyeglasses, and particularly to a device for preventing the accidental loosening of the screw which is employed to effect the connection.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is a fragmentary elevation illustrating the invention. Fig. 2 is an enlarged sectional view looking toward the head of the screw on the stud. Fig. 3 is a section on the line 3 3 of Fig. 2, and Fig. 4 is a detail perspective view of the screw-lock.

$a$ indicates the lens; $b$, the spring; $c$, the guard, and $d$ the stud, which latter element is fastened to the lens and carries the spring and guard. On the stud $d$ are formed the usual flanges $d'$ and $d^2$. Of these flanges the latter is shortened for a purpose which will be fully described hereinafter. In some forms of construction both flanges are short and of equal height. My invention is applicable to either form. Between the flanges $d'$ and $d^2$ the ends of the spring $b$ and of the shank $c'$ of the guard $c$ are placed. $e$ indicates the screw for holding these parts in position. This screw is prevented from becoming accidentally loosened by means of the screw-lock $f$, which constitutes the important feature of my invention. This screw-lock is in the form of a plate with a diagonal slot $f'$ therein which receives the shank of the screw. The plate is also formed on its inner end adjacent to one edge with a groove $f^2$, receiving the shortened flange $d^2$ of the stud $d$, and at the edge to which this groove $f^2$ is adjacent are formed inwardly-bent flanges or teeth $f^3$, which lie against the outer side of the flange $d^2$.

The parts being constructed and arranged as shown and the screw $e$ being tightened, it will be observed that the screw-lock $f$ will be held firmly and removably in place on the stud and that idle movement of the parts will be prevented. It is this idle movement that loosens the screw, and by means of my invention the loosening of the screw is avoided.

The screw-lock of the form shown may be readily adjusted to the size and shape of the stud, and is therefore applicable to any eyeglasses with the parts as previously constructed, excepting, of course, that the flange $d^2$ must be fitted to the screw-lock. The diagonal slot $f'$ enables the screw-lock to be readily adjusted with respect to the screw, and it also bears against the shank of the screw and prevents upward or downward movement of the lock. (See Fig. 2.) By providing the two flanges or teeth $f^3$ in place of a continuous flange on the screw-lock both of the flanges or teeth $f^3$ may be made to bear on the flange of the stud, notwithstanding that said flange may be curved.

Various changes in the form and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. A screw-lock for eyeglasses, comprising a plate having a slot formed therein to receive the shank of the screw, a groove in the inner face of said plate adjacent to one edge, and an inwardly-extending flange at said edge, as set forth.

2. A screw-lock for eyeglasses, comprising a plate having a diagonal slot formed therein to receive the screw, and a groove in the inner face of the said plate adjacent to one edge, as set forth.

3. A screw-lock for eyeglasses, comprising an eyeglass-stud having flanges, a plate with a diagonal slot therein, said plate having adjacent to one edge a groove to receive the adjusting-stud flange, and the plate also having a laterally-turned tooth or flange adjacent to the groove, the tooth or flange lying on the outside of the flange of the stud of the eyeglasses.

4. The combination with an eyeglass-stud having flanges, of a screw-lock comprising a plate having a diagonal slot therein to receive the shank of the fastening-screw, the said plate being provided with a groove in its inner face adjacent to one edge and extending from the top to the bottom of the plate and adapted to receive one of the stud-flanges, the said plate being further provided with an inwardly-bent flange at the edge adjacent to the groove, as set forth.

5. The combination with the eyeglass-stud having flanges adapted to receive between them the ends of the spring and guard-shank, one of said flanges being shorter than the other, of a screw-lock comprising a plate having a diagonal slot to receive the screw, the said plate being provided with a groove in its inner face adjacent to one edge to receive the shorter flange of the stud, the plate having at said edge inwardly-bent flanges or teeth adapted to engage the outer side of the shorter flange of the stud, the opposite edge of the said plate extending at the inner side of the longer flange of the stud, as set forth.

In testimony whereof I have signed my name to this specification in the presence of two subscribing witnesses.

JOHN CARTER.

Witnesses:
JOHN CARTER, Sr.,
HUGH H. CARTER.